Feb. 16, 1971   R. L. LANDIS   3,562,957
CLOSURE SEALING APPARATUS
Filed Feb. 26, 1969
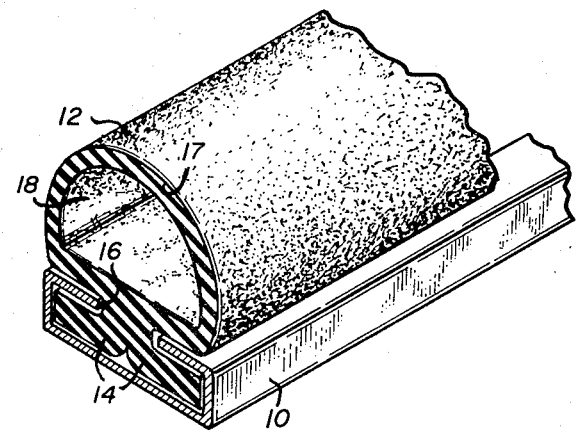
Fig_1
PRIOR ART
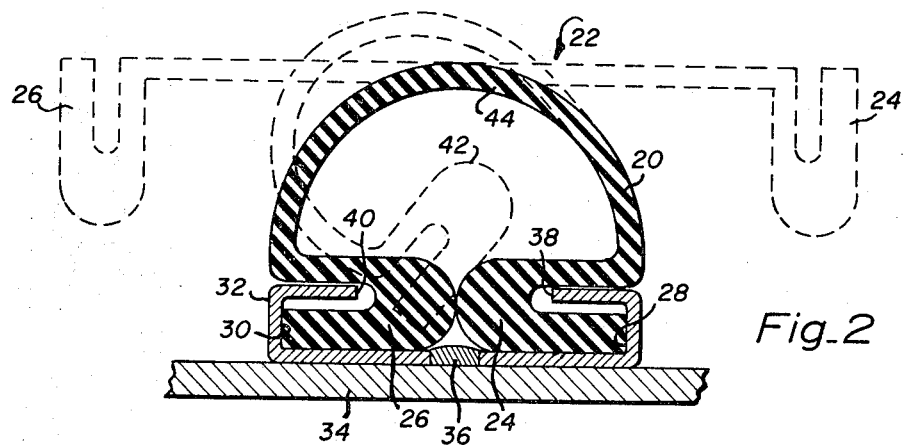
Fig_2
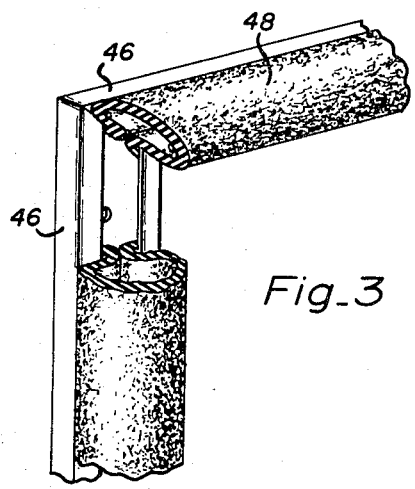
Fig_3
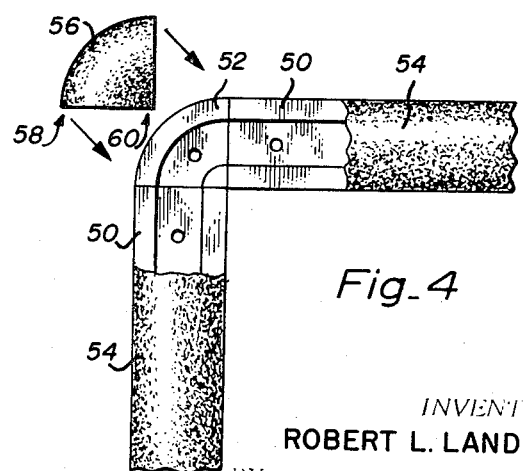
Fig_4
INVENTOR.
ROBERT L. LANDIS
BY
ATTORNEY

United States Patent Office 3,562,957
Patented Feb. 16, 1971

1

3,562,957
CLOSURE SEALING APPARATUS
Robert L. Landis, Los Altos Hills, Calif., assignor to The Landis Sales Company, Los Altos Hills, Calif., a corporation of California
Filed Feb. 26, 1969, Ser. No. 802,401
Int. Cl. E06b 7/16
U.S. Cl. 49—493                           5 Claims

ABSTRACT OF THE DISCLOSURE

A closure sealing apparatus comprised of a mounting bracket which is generally C-shaped in cross section and a flexible gasket member formed from a strip of flexible resilient material having U-shaped edges turned normal to the plane of said strip. The strip is rolled about its longitudinal axis and inserted into said bracket by causing one U-shaped edge at a time to engage the respective lips of said bracket.

BACKGROUND OF THE INVENTION

The present invention relates generally to closure sealing apparatus and, more particularly, to a novel gasket and mounting structure combination for simplifying installation and replacement of the flexible gasket member.

One of the principal problems associated with heavy duty sealing apparatus is the difficulty of attaching the sealing member to the surface that is to be sealed. In applications such as railroad freight car doors where the door and seal may be subjected to rather hostile environments and abusive treatment it is not at all unlikely that the sealing member may require replacement several times during the life of the structure which forms the compartment being sealed. And since the closure opening may be as large as ten to fifteen feet wide, the lengths of the sealing member components are long enough to make ordinary installation quite laborious. For example, it is not unusual for the length of gasket required for a single door to exceed forty feet or more. Therefore even a slight improvement in the case of installation is significant from a labor standpoint.

It has long been common practice in the prior art to utilize ribbon-like strips of flexible material deformed into semi-cylindrical configurations as sealing gaskets. These types of sealing gaskets have heretofore been attached to the door or wall of a sealable enclosure by a rigid retainer or clamping strip which, when secured to the surface to be sealed, holds the flexible sealing member in place. The retainer strips are typically screwed, bolted, or welded to the surface to be sealed before the sealing member is inserted under the lips of the retainer strip. Examples of closure sealing apparatus of this type are disclosed in the U.S. patents to Lewis, No. 2,130,017; Gayle, No. 2,230,985, and Landis, No. 3,284,957. Another more recent prior art form is illustrated in FIG. 1 of the drawing.

The principal disadvantages of the prior art sealing structures is the difficulty of mounting the sealing gasket to the bracket or clamping strip. In most of the prior art structures, the sealing gasket must be either slid into the bracket from one end after the bracket is mounted, or assembled to the bracket before the bracket is mounted.

2

In the former instance at least some disassembly of the bracket structure is required at the corners where the sealing surface is rectangular. In the latter case, the bracket and gasket are assembled prior to mounting and the assembly is then secured to the surface to be sealed by some suitable attaching means. This usually requires access to the back side of the sealed surface in order to enable the bracket to be secured to the wall by a bolting, screwing, or spot welding.

OBJECTS OF THE INVENTION

It is therefore a principal object of the present invention to provide a novel sealing structure which can be easily assembled and the flexible gasket can later be replaced without requiring disassembly of the mounting bracket.

Another object of the present invention is to provide a flexible sealing gasket which may be easily installed in a mounted or unmounted bracket without requiring the use of elaborate tools.

Still another object of the present invention is to simplify the construction and manner of mounting of flexible sealing gaskets while, at the same time, retaining the operative qualities of sealing strips of the type described.

SUMMARY OF THE PRESENT INVENTION

In accordance with the present invention, the novel sealing structure is comprised of a generally C-shaped mounting bracket or strip which can be independently mounted on the closure surface to be sealed and a ribbon-like strip of flexible gasket material having U-shaped deformations along either side. The U-shaped deformations are such that one side of the gasket can be slipped over one of the lips of the C-shaped clamping strips, and the gasket rolled into semi-circular configuration so that the other U-shaped edge can be caused to engage the other lip of the C-shaped bracket. The principal dimensions of the U-shaped edges of the sealing gasket are such that when assembled in the mounting bracket, they coact with the walls thereof as well as with each other so as to lock the gasket in the mounting bracket.

A principal advantage of the present invention is that once the mounting bracket is attached to the closure surface the sealing strip can be permanently inserted therein manually without requiring any tools.

Another advantage of the present invention is that when the need for gasket replacement arises the old gasket can be removed without disassembling the mounting bracket, and the new gasket can be inserted into the old bracket with the same ease that the original gasket was inserted.

Still other advantages of the present invention will become apparent to those skilled in the art after having read the following disclosure of a preferred embodiment illustrated in the several figures of the drawing.

IN THE DRAWING

FIG. 1 is an illustrative segment of a prior art sealing structure.

FIG. 2 is a cross section of a sealing strip in accordance with the present invention.

FIG. 3 illustrates the manner in which a seal is provided at a closure corner.

FIG. 4 illustrates an alternate manner in which a seal is provided at a closure corner.

DETAILED DESCRIPTION OF THE PREFERRED EMBODIMENTS

Referring now to FIG. 1 of the drawing, there is shown a prior art sealing structure which includes a generally C-shaped mounting strip 10 and an extruded tubular gasket 12 including a pair of lips 14 for being received within the mounting bracket 10. This type of sealing gasket can be inserted within the bracket 10 either by sliding the lips 14 in from an open end of the bracket 10, or by deforming the lips 14 downwardly paralleling one another so that they may be inserted into the bracket cavity through the slit formed by the edges 16 of the bracket 10. Although this type of sealing structure has been found suitable for certain applications, it suffers from several important disadvantages.

The principal disadvantage involves the difficulty of forming the sealing gasket 12. In order that the gasket 12 have the desired resilient characteristics, it is necessary that the cavity 18 be provided along the length thereof. This means that the gasket 12 must be formed by extrusion and, as such, means must be provided for insertion into the cavity 18 after extrusion and during the cooling and curing stages in order to achieve the desired form. This is necessary since, without such a forming means, the walls 17 of the gasket 12 might collapse and at any rate uniformity of cross section could not be provided. Thus, the manufacture of the gasket 12 is both complicated and expensive.

Another disadvantage of this type of gasket is that it is fairly difficult to deform the lips 14 by hand for insertion into the bracket 10. Obviously, the lips 14 must be so deformed along the entire length of the sealing strip and require considerable manual dexterity to perform the insertion. But the most important disadvantage is that the gasket 12 is even more difficult to remove from the bracket 10 than it was to insert it. Because of the required rigidity of the elastomeric gasket material, one cannot simply pull on the gasket 12 in order to extract the lips 14 from the bracket cavity. To do so would require an extremely large force which might damage the bracket 10 or cause it to become unattached from the closure surface to which it is affixed. Thus, the only practical way to remove the gasket 12 is to slide it out of an open end of the bracket 10. This, of course, requires that a portion of the bracket 10 be disassembled.

Turning now to FIG. 2 of the drawing, a novel gasket structure in accordance with the present invention is illustrated. It will be noted from this cross-sectional illustration that the gasket 20 is formed of resilient strip material which has been deformed into a configuration which resembles that of the prior art structure of FIG. 1. It will be noted, however, that the original configuration of the gasket 20 was of a generally planar strip such as illustrated by the dashed lines 22. The planar strip of resilient material 22 includes U-shaped side edges 24 and 26 which can easily be formed integral with the planar portion 22 by any suitable manner of manufacture.

The vertical dimension of the U-shaped edges 24 and 26 is chosen to be one half the interior dimension between the inner faces 28 and 30 of the C-shaped bracket member 32. Once the C-shaped bracket 32 is affixed to the closure wall 34 by means of spot welds 36 or other suitable means of attachment, the gasket 20 can be easily and quickly inserted into the bracket by simply slipping the U-shaped edge 24 over the lip 38 of the bracket 32, then deforming the gasket into a generally semicircular configuration so that the U-shaped edge 26 can be inserted over the lip 40 as illustrated by the dashed lines 42.

Because of the resiliency of the gasket 20, the U-shaped edges 24 and 26 will naturally assume the mounted positions shown in FIG. 2 and will be substantially irremovable from that position by external force applied to the gasket 20 so long as the gasket remains intact. One of the unique features of this invention is that the gasket 20 can be easily removed for replacement by simply slitting the semicircular portion thereof along the entire length, as with a knife or the like, and then simply removing the portions 24 and 26 from the bracket 32. Once the body portion 44 has been severed, there is no longer any outward torque applied to the U-shaped edges 24 and 26 causing them to remain within the cavity of the bracket 32 and they can easily be extracted therefrom by hand.

In FIG. 3 of the drawing, one type of closure corner is illustrated. In accordance with this technique, the sealing member 20 is merely trimmed to the proper length with the ends thereof cut on a 45° angle and the respective side gaskets are inserted into the previously mounted brackets 46 in the manner shown in FIG. 2. Once each side gasket 48 is inserted, the sealing structure is complete.

In FIG. 4 an alternate corner structure is illustrated which includes a pair of side brackets 50 and a formed and radiused corner bracket 52. In this embodiment, the regular gaskets 54 are mounted to the brackets 50 in the manner shown in FIG. 2 and a specially formed corner gasket member 56 is mounted to the radiused corner bracket member 52 in a similar manner. The corner gasket 56 likewise includes U-shaped edges 58 and 60 for insertion under the lips of the bracket 52.

The many advantages of the above-described gasket apparatus will be apparent to those skilled in the art. For example, the gasket strip per se can be formed using any suitable process and does not require the expensive interior cavity forming apparatus which is required to fabricate the structurally similar element of the prior art. Furthermore, because of the fact that the bracket engaging lips of the gasket are independent of each other, they may be inserted individually and do not require deformation of the U-shaped edges in order to enable insertion into the C-shaped bracket. The simplicity of extraction of a worn or deteriorated sealing member is also quite important because of the considerable time savings involved.

After having read the above disclosure, many alterations and modifications of the invention will undoubtedly become apparent to those of skill in the art. It is, therefore, to be understood that this description is of a preferred embodiment and is for the purpose of illustration only and is in no manner intended to be limiting in any way. Accordingly, I intend that the appended claims be interpreted as covering all modifications which fall within the true spirit and scope of my invention.

What is claimed is:

1. A sealing means for closure apparatus comprising:
an elongated rigid bracket member for attachment to said closure apparatus, said bracket member being generally C-shaped in cross section and having means provided therein for enabling said bracket member to be attached to said closure apparatus; and
a flexible gasket means mountingly received by said bracket member, said gasket means being formed from a generally planar strip of elastomeric material having side edges with U-shaped cross section, the legs of said U-shaped sections being disposed at substantially right angles to said planar strip, the distance between the tops of the outer legs of said U-shaped sections and the bottoms of said U-shaped sections being substantially equal to one half the effective inside dimension of said bracket member whereby said bottoms of said U-shaped sections abut against each other and said tops abut opposite inside walls of said bracket member.

2. Sealing means for closure apparatus comprising:
rigid bracket means having a generally C-shaped cross section, the terminal lips of said C-shaped cross section lying in a common plane and forming a longitudinal slit in said bracket means the width of which is less than the inside width of said bracket means; and elongated flexible gasket means having a generally D-shaped cross section, the straight line portion of said D-shaped section being separated at its midpoint into two segments, said segments being of U-shaped cross section with the openings in each U-shaped section facing in opposite directions and receiving said lips of said bracket means, said lips holding said segments in abutting relationship whereby said gasket means is operatively secured to said bracket means.

3. Sealing means as recited in claim 2 wherein said segments are dimensionally thicker than the main body of said gasket means in order to accommodate said grooves.

4. A sealing means as recited in claim 1 wherein said bottoms of said U-shaped sections are rounded so as to facilitate the insertion of said gasket means into said bracket member.

5. A sealing means as recited in claim 7 wherein said U-shaped sections are of generally thicker cross section than the remainder of said gasket means and may be inserted into said bracket member without deformation.

References Cited

UNITED STATES PATENTS

| | | | |
|---|---|---|---|
| 2,116,426 | 5/1938 | Cecil | 49—499X |
| 3,179,984 | 4/1965 | Bailey | 49—499X |
| 3,241,198 | 3/1966 | Baermann | 49—499X |

DAVID J. WILLIAMOWSKY, Primary Examiner

P. O. KANNAN, Assistant Examiner